(12) United States Patent
Minegishi et al.

(10) Patent No.: US 9,340,289 B2
(45) Date of Patent: May 17, 2016

(54) AIRCRAFT LAVATORY UNIT AND DISPOSITION CONFIGURATION THEREFOR

(71) Applicant: The Yokohama Rubber Co., LTD., Minato-ku, Tokyo (JP)

(72) Inventors: Eita Minegishi, Hiratsuka (JP); Takashi Koyama, Hiratsuka (JP); Susumu Matono, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 85 days.

(21) Appl. No.: 14/380,621

(22) PCT Filed: Feb. 21, 2013

(86) PCT No.: PCT/JP2013/000990
§ 371 (c)(1),
(2) Date: Aug. 22, 2014

(87) PCT Pub. No.: WO2013/125230
PCT Pub. Date: Aug. 29, 2013

(65) Prior Publication Data
US 2015/0298809 A1    Oct. 22, 2015

(30) Foreign Application Priority Data
Feb. 23, 2012    (JP) ................. 2012-037270

(51) Int. Cl.
*B64C 11/02*    (2006.01)
*B64D 11/02*    (2006.01)
(Continued)

(52) U.S. Cl.
CPC . *B64D 11/02* (2013.01); *A62C 3/00* (2013.01); *B64D 11/04* (2013.01); *B64D 11/06* (2013.01); *A62C 3/08* (2013.01); *B64D 2011/0046* (2013.01); *B64D 2045/009* (2013.01)

(58) Field of Classification Search
CPC ........ B64D 11/02; B64D 11/03; B64D 11/04; A62C 3/00
See application file for complete search history.

(56) References Cited

U.S. PATENT DOCUMENTS 3,408,025 A * 10/1968 Davis ...................... A62B 3/00
                                                          182/230
4,022,404 A *  5/1977 Greiss .................... B64D 11/04
                                                           186/40
(Continued)

FOREIGN PATENT DOCUMENTS

EP        1 283 065        2/2003
FR        2 929 244       10/2009
(Continued)

OTHER PUBLICATIONS

International Search Report dated May 21, 2013, 4 pages, Japan.

*Primary Examiner* — Justin Benedik
(74) *Attorney, Agent, or Firm* — Thorpe North & Western (57) ABSTRACT

Provided is an aircraft lavatory unit that advantageously allows for a reduced number of parts, simplified assembly, and reduced costs while ensuring convenience. First and second lavatories are provided adjacent to one another within a structural frame. Respective sinks of the lavatories are disposed by being attached to the partition wall. A trash insertion port is provided on a wall surface of each base. A single storage chamber provided within the bases of the sinks of the lavatories extends into the bases of the sinks of the lavatories through an opening provided in the partition wall. A trash can device has a single trash can housed in the storage chamber and a single fire extinguisher. A water heater is singularly provided, which is disposed within the base of one of the sinks.

9 Claims, 8 Drawing Sheets

(51) Int. Cl.
*A62C 3/00* (2006.01)
*B64D 11/04* (2006.01)
*B64D 11/06* (2006.01)
*B64D 11/00* (2006.01)
*B64D 45/00* (2006.01)
*A62C 3/08* (2006.01)

(56) References Cited

U.S. PATENT DOCUMENTS

| | | | | |
|---|---|---|---|---|
| 5,205,515 | A * | 4/1993 | Luria | B64D 11/0007 186/40 |
| 6,003,813 | A * | 12/1999 | Wentland | B64D 11/00 244/118.5 |
| 6,007,025 | A | 12/1999 | Coughren et al. | |
| 6,152,400 | A * | 11/2000 | Sankrithi | B64D 11/00 105/315 |
| 7,284,287 | B2 * | 10/2007 | Cooper | B64D 11/02 4/664 |
| 8,608,108 | B2 * | 12/2013 | Boren | B64D 11/00 244/118.5 |
| 2003/0019641 | A1 * | 1/2003 | Reynolds | A62C 3/08 169/62 |
| 2003/0029967 | A1 * | 2/2003 | Mills | B64D 11/00 244/118.5 |
| 2004/0163170 | A1 | 8/2004 | Cooper et al. | |
| 2004/0227034 | A1 | 11/2004 | Wentland et al. | |
| 2005/0217871 | A1 | 10/2005 | Reynolds | |
| 2005/0241062 | A1 | 11/2005 | Quan | |
| 2009/0261200 | A1 | 10/2009 | Saint-Jalmes et al. | |
| 2012/0012706 | A1 * | 1/2012 | Ehlers | B64D 11/02 244/118.5 |
| 2015/0266583 | A1 | 9/2015 | Ehlers et al. | |

FOREIGN PATENT DOCUMENTS

| | | |
|---|---|---|
| JP | 2008-239036 | 10/2008 |
| WO | WO 2010/108780 | 9/2010 |
| WO | WO 2011/101385 | 8/2011 |

\* cited by examiner

AIRCRAFT LAVATORY UNIT AND DISPOSITION CONFIGURATION THEREFOR

TECHNICAL FIELD

An aircraft lavatory unit comprises a structural frame in which a lavatory is provided, a sink and toilet provided in the lavatory, and so forth.

BACKGROUND

An aircraft lavatory unit comprises a structural frame in which a lavatory is provided, a sink and toilet provided in the lavatory, and so forth.

A plurality of such lavatory units is provided throughout the fuselage, with separate sinks and toilets being provided in each lavatory unit.

For this reason, the lavatory unit has a large number of constituent members and parts, and is not easily assembled. Thus, there is a disadvantage when attempting to reduce costs.

Meanwhile, US Patent Publication No. 2004/0227034 A1 (FIG. 2) discloses a lavatory unit in which a structural frame is provided with two lavatories, each lavatory being provided with a plurality of toilets and one sink.

However, while the lavatory unit disclosed in US Patent Publication No. 2004/0227034 A1 allows the number of parts constituting the lavatory unit to be reduced, and costs to be reduced, the lavatory unit presents disadvantages that lead to reduced convenience, such as the fact that other users must wait when a user is using the sink.

SUMMARY

A trash can device is provided within a sink of each lavatory unit in an aircraft. The trash can device has a trash can, housed in a storage chamber within the sink, into which trash is thrown through a trash insertion port in the sink, and a fire extinguisher that sprays a fire-extinguishing agent into the trash can when a set temperature is reached or exceeded.

In a lavatory unit of an aircraft, a water heater is also provided on a water supply pipe leading to a faucet of a sink in each lavatory.

The aircraft lavatory unit and disposition configuration therefor according to the present technology has been devised by focusing on such a trash can device and water heater, and the present technology provides an aircraft lavatory unit that advantageously allows for a reduced number of parts, simplified assembly, and reduced costs while ensuring convenience. The present technology further provides a disposition configuration for a lavatory unit that advantageously allows the number of seats in the fuselage to be increased while maintaining the same number of lavatories.

An example of the present technology is an aircraft lavatory unit provided with: a structural frame provided with a lavatory, the entrance to which is opened and closed by a door; a sink provided in the lavatory and having a trash insertion port opened therein; a trash can device having a trash can housed in a storage chamber within the sink and containing trash thrown through the trash insertion port, and a fire extinguisher for spraying a fire-extinguishing agent into the trash can when a set temperature is reached or exceeded; and a water heater provided on a water supply pipe connected to a faucet of the sink. A single unit of such structural frame has a plurality of lavatories partitioned therein; and at least one of the trash can device and the water heater is singularly provided and is shared by the plurality of lavatories.

Another example of the present technology is a disposition configuration for the lavatory unit, wherein a fuselage of the aircraft is provided with: a longitudinal aisle extending in a longitudinal direction of the fuselage and positioned at an intermediate position with respect to a latitudinal direction of the fuselage; seat groups in which a plurality of seat rows are arranged in rows in the longitudinal direction of the fuselage on left and right sides of the longitudinal aisle, the seat rows having a plurality of seats facing the front of the fuselage and arranged in rows in the latitudinal direction of the fuselage; and a latitudinal aisle extending from a boarding entrance of the fuselage in the latitudinal direction and connecting with the longitudinal aisle. A seat row nearest the latitudinal aisle in one seat group of the seat groups on the right and left sides of the longitudinal aisle is positioned further away from the latitudinal aisle, with respect to the longitudinal direction of the fuselage, than a seat row nearest the latitudinal aisle in another seat group. The lavatory unit is disposed between the latitudinal aisle and the seat row nearest the latitudinal aisle in the one seat group at a location corresponding to the seat row nearest the latitudinal aisle in the other seat group across the longitudinal aisle. The plurality of lavatories is arranged in a row in the latitudinal direction, entrances to the lavatories each being positioned in the latitudinal aisle.

Another aspect of the present technology is a disposition configuration for the lavatory unit, wherein a fuselage of the aircraft is provided with: a longitudinal aisle extending in a longitudinal direction of the fuselage and positioned at an intermediate position with respect to a latitudinal direction of the fuselage; seat groups in which a plurality of seat rows are arranged in rows in the longitudinal direction of the fuselage on left and right sides of the longitudinal aisle, the seat rows having a plurality of seats facing the front of the fuselage and arranged in rows in the latitudinal direction of the fuselage; a latitudinal aisle, extending from a boarding entrance of the fuselage in the latitudinal direction at a rear part of the fuselage and connecting with the longitudinal aisle; and a galley disposed along the latitudinal direction behind the latitudinal aisle at the rear part of the fuselage. The lavatory unit is disposed in a row with the galley in the latitudinal direction behind the latitudinal aisle at the rear part of the fuselage. The plurality of lavatories is disposed in a row in the latitudinal direction, entrances to the lavatories each being positioned in the latitudinal aisle.

The lavatory unit according to the present technology includes a single structural frame that has a plurality of lavatories partitioned therein, where at least one of the trash can device and the water heater is singularly provided and is shared by the plurality of lavatories. The lavatory unit advantageously allows for a reduced number of parts, simplified assembly, reduced space occupation, and reduced costs while ensuring convenience.

Furthermore, in accordance with the disposition configuration for lavatory unit according to the present technology, the space occupied by the lavatory unit is reduced, advantageously allowing the number of seats in the fuselage to be increased while maintaining the same number of lavatories.

DETAILED DESCRIPTION

Lavatory Unit According to a First Embodiment

A lavatory unit according to an embodiment of the present technology will now be described with reference to the drawings.

Figure 1:
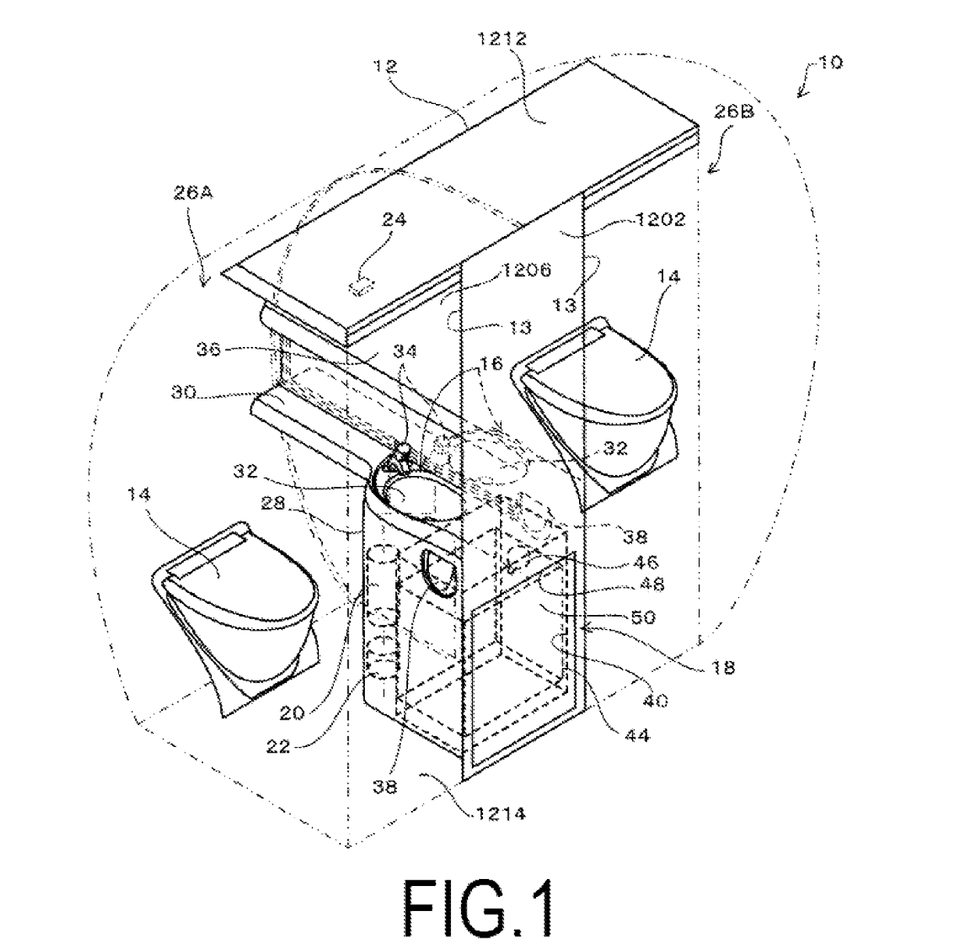
FIG. 1 is a perspective view of the configuration of a lavatory unit according to a first embodiment.
Figure 2:
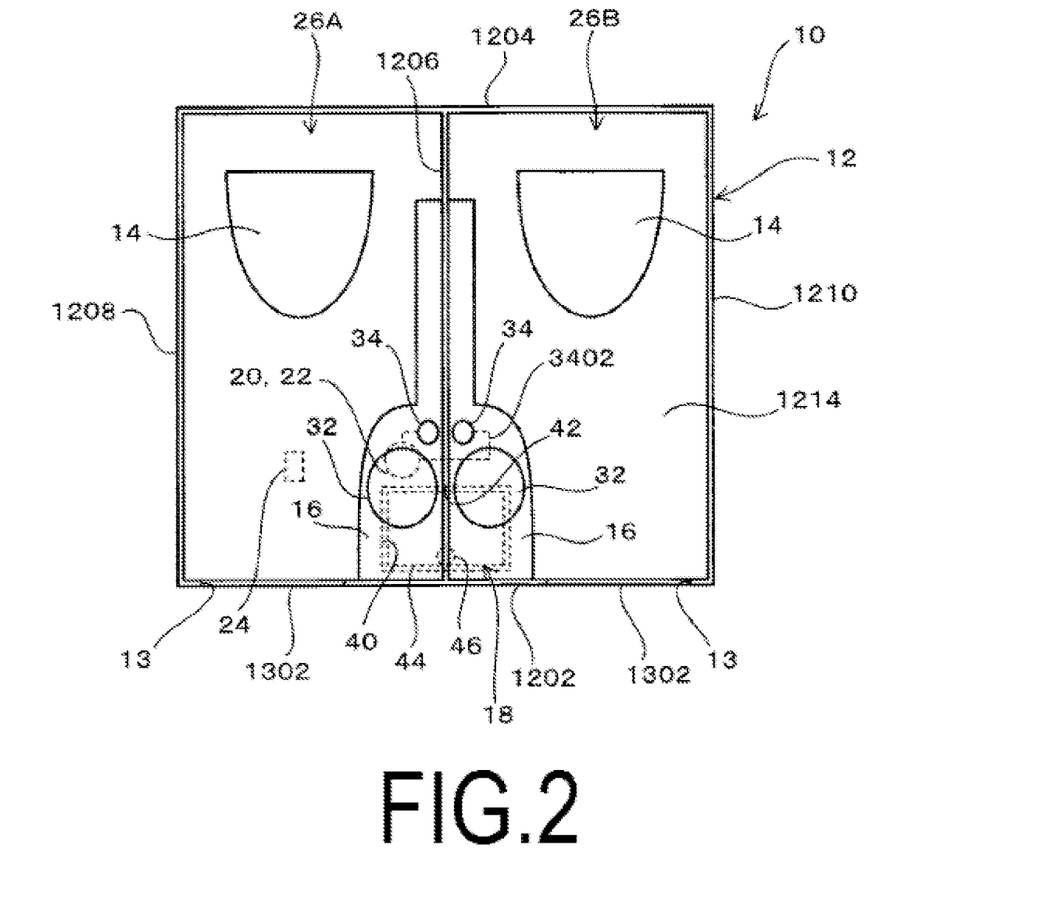
FIG. 2 is a plan view of the configuration of the lavatory unit according to the first embodiment.

As illustrated in FIGS. 1 and 2, a lavatory unit 10 according to a first embodiment is installed on the floor of an aircraft, and comprises a structural frame 12, a toilet 14, a sink 16, a trash can device 18, a water heater 20, a faucet controller 22, and a lighting controller 24.

In the lavatory unit 10 according to the present embodiment, there is only one each of the structural frame 12, the trash can device 18, the water heater 20, the faucet controller 22, and the lighting controller 24.

Two lavatories, a first lavatory 26A and a second lavatory 26B, are provided adjacent to one another within the structural frame 12.

The structural frame 12 has a front wall 1202, a rear wall 1204 facing the front wall 1202, a partition wall 1206, left and right side walls 1208, 1210, a ceiling wall 1212, and a bottom wall 1214.

The front wall 1202 is provided with two entrances 13, the respective entrances 13 connecting to the lavatories 26A, 26B, and each of the entrances 13 being opened and closed by a door 1302.

The partition wall 1206 extends between the front wall 1202 and the rear wall 1204, partitioning the area between the front wall 1202 and the rear wall 1204 into the two lavatories 26A, 26B. There is only a single partition wall 1206, allowing for a reduced number of parts.

The left and right side walls 1208, 1210 connect left and right edges of the front wall 1202 and left and right edges of the rear wall 1204. The ceiling wall 1212 defines the respective upper parts of the lavatories 26A, 26B, and the bottom wall 1214 defines the respective lower parts of the lavatories 26A, 26B.

The structural frame 12 has the lower parts of the side walls 1208, 1210 or the bottom wall 1214 coupled to the floor of the fuselage according to a known attachment structure.

A toilet 14 is provided in each of the lavatories 26A, 26B.

The respective sinks 16 of the first lavatory 26A and the second lavatory 26B are disposed by being attached to the partition wall 1206.

The sink 16 comprises a base 28 rising from the bottom wall 1214, a counter 30 provided on the upper part of the base 28, a wash basin 32 provided on the counter 30, a faucet 34 provided on the counter 30, and a mirror 36 provided above the counter 30.

A trash insertion port 38 is provided on a wall surface of each base 28.

Furthermore, a single storage chamber 40 is provided within the base 28 of the sink 16 of each of the lavatories 26A, 26B.

The storage chamber 40 extends into the base 28 of the sink 16 of each of the lavatories 26A, 26B through an opening 42 provided in the partition wall 1206.

The trash can device 18 has a single trash can 44 and a single fire extinguisher 46.

The trash can 44 contains trash thrown through the trash insertion ports 38.

The trash can 44 is housed within the storage chamber 40, and extends into the base 28 of the sink 16 of each of the lavatories 26A, 26B. Specifically, the trash can 44 is provided so as to pass through the partition wall 1206, allowing the amount of space that would be occupied by a conventional trash can provided in each of the lavatories 26A, 26B, to be reduced while maintaining the same capacity that would be afforded by providing individual conventional trash cans in each of the lavatories 26A, 26B, allowing for the amount of space occupied by the lavatory unit 10 to be reduced.

The fire extinguisher 46 is attached to the outside of the storage chamber 40 with a spray nozzle thereof inserted into the storage chamber 40 through a hole formed in a wall defining the storage chamber 40.

The fire extinguisher 46 sprays a fire-extinguishing agent from the spray nozzle into the trash can 44 when a set temperature is reached or exceeded. A conventionally known inert gas, such as chlorofluorocarbon gas or halon gas, can be used as the fire-extinguishing agent, and a commercially available product can be used for the fire extinguisher 46.

The trash can 44 is inserted into and removed from the storage chamber 40 through an opening 48 provided in the front wall 1202, or through an opening provided in one or both of the bases 28 of the two sinks 16, the opening(s) being closed by a lid plate 50.

There is a single water heater 20, which is disposed, for example, within the base 28 of one of the two sinks 16. This allows the amount of space that would be occupied by individually providing conventional water heaters in each of the lavatories 26A, 26B to be reduced, allowing for the amount of space occupied by the lavatory unit 10 to be reduced. The water heater 20 is connected to a water supply pipe 3402 leading to the faucet 34 and heats cold water provided by a water supply pipe in the fuselage, providing the water to the faucets 34 of the two sinks 16 via the water supply pipe 3402 as hot water.

Furthermore, the faucet controller 22 with which the lavatory unit 10 is provided is disposed within the base 28 of one of the two sinks 16.

When an infrared sensor with which each of the faucets 34 of the two sinks 16 is provided detects that a hand is inserted under the faucet 34, the faucet controller 22 opens a valve of the faucet 34 corresponding to the infrared sensor having detected the hand for a fixed length of time to provide cold water or hot water.

Furthermore, the lighting controller 24 with which the lavatory unit 10 is provided is disposed at a suitable location within the lavatories 26A, 26B, such as on the ceiling wall 1212.

The lighting controller 24 individually turns on a lighting device (a fluorescent lamp, an LED, etc.) of each of the lavatories 26A, 26B, and is provided with a circuit that adjusts electric power supplied from the fuselage to a voltage and frequency suitable to drive the lighting devices and supplies the electric power to the lighting devices.

Next, the effects of the present embodiment will be described.

In accordance with the present embodiment, a single structural frame 12 has two lavatories 26A, 26B partitioned therein, and the trash can device 18 and the water heater 20 both are singularly provided and are shared by the two lavatories 26A, 26B, advantageously allowing for a reduced number of parts, simplified assembly, reduced space occupation, and reduced costs compared to cases in which two lavatory units are simply overlapped, while maintaining convenience.

Note that a case in which the trash can device 18 and the water heater 20 both are singularly provided and are shared by two lavatories 26A, 26B has been described for the present embodiment, but similarly advantageous effects of allowing for a reduced number of parts, simplified assembly, reduced space occupation, and reduced costs while maintaining convenience will also be demonstrated if at least one of the trash can device 18 and the water heater 20 is singularly provided and is shared by the two lavatories 26A, 26B.

Furthermore, the use of a single partition wall 1206 and a single trash can device 18 is more advantageous in allowing for the amount of space occupied by the lavatory unit 10 to be reduced while maintaining the capacity of the lavatories.

Note that a case in which the entrances 13 are provided on the front wall 1202 has been described for the embodiment described above, but the entrances 13 may be provided on the left and right side walls 1208, 1210 according to the location within the fuselage of the aircraft at which the lavatory unit 10 is installed. For example, if a plurality of longitudinal aisles extending in the longitudinal direction of the fuselage is provided, part of a seat group sandwiched by two of the longitudinal aisles is removed, and the lavatory unit 10 is disposed with the front wall 1202 facing the front or rear of the fuselage at the location where the seat group has been removed, the entrances 13 will be provided on the left and right side walls 1208, 1210.

Lavatory Unit According to a Second Embodiment

Next, a lavatory unit according to a second embodiment will be described.

Note that, in the embodiment below, parts identical or similar to those of the first embodiment are assigned identical reference numerals, and descriptions thereof are omitted or described simply.

Figure 3:
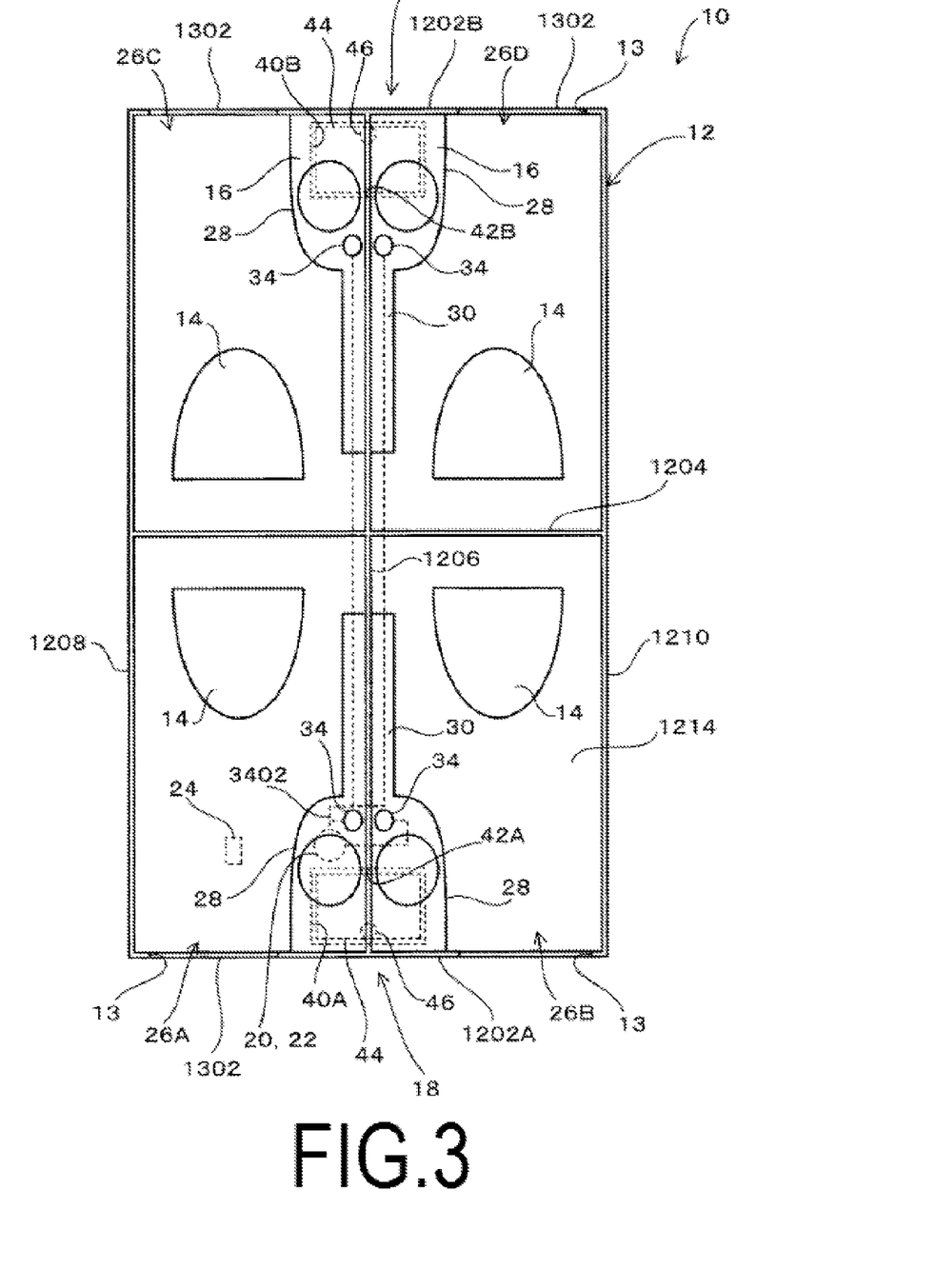
FIG. 3 is a plan view of the configuration of a lavatory unit according to a second embodiment.

As illustrated in FIG. 3, a lavatory unit 10 according to a second embodiment has four lavatories provided within a single structural frame 12.

The lavatory unit 10 comprises a structural frame 12, four toilets 14, four sinks 16, two trash can devices 18, one water heater 20, one faucet controller 22, and one lighting controller 24.

There is a single structural frame 12, within which four lavatories, a first lavatory 26A, a second lavatory 26B, a third lavatory 26C, and a fourth lavatory 26D, are provided adjacent to one another.

The structural frame 12 has a first front wall 1202A, a second front wall 1202B, a rear wall 1204, a partition wall 1206, left and right side walls 1208, 1210, a ceiling wall (not illustrated), and a bottom wall 1214.

The first front wall 1202A and the second front wall 1202B are each provided with two entrances 13, the respective entrances 13 leading to the lavatories 26A-26D, and each of the entrances 13 being opened and closed by a door 1302.

There is a single rear wall 1204, which is provided between the first front wall 1202A and the second front wall 1202B so as to face the front walls 1202A, 1202B.

There is a single partition wall 1206 provided over the first front wall 1202A, the second front wall 1202B, and the rear wall 1204.

The left and right side walls 1208, 1210 are connected to left and right edges of the first front wall 1202A, left and right edges of the second front wall 1202B, and left and right edges of the rear wall 1204.

The ceiling wall (not illustrated) defines the respective upper parts of the lavatories 26A-26D, and the bottom wall 1214 defines the respective lower parts of the lavatories 26A-26D.

The first lavatory 26A and the second lavatory 26B are partitioned by the partition wall 1206 on the inside of the first front wall 1202A, and the third lavatory 26C and the fourth lavatory 26D are partitioned by the partition wall 1206 on the inside of the second front wall 1202B.

In the present embodiment, there is a single partition wall 1206 and a single rear wall 1204, allowing for a reduced number of parts and reduced space occupation.

The toilets 14 are each provided in each of the lavatories 26A-26D.

The respective sinks 16 of the first lavatory 26A, the second lavatory 26B, the third lavatory 26C, and the fourth lavatory 26D are disposed by being attached to the partition wall 1206.

As in the case of the first embodiment, The sinks 16 each comprises a base 28, a counter 30, a wash basin 32, a faucet 34, and a mirror 36 (FIG. 1).

A trash insertion port 38 (FIG. 1) is provided on a wall surface of each base 28.

Furthermore, a single first storage chamber 40A is provided within the bases 28 of the sinks 16 of the first lavatory 26A and the second lavatory 26B.

The first storage chamber 40A extends into the bases 28 of the sinks 16 of the first lavatory 26A and the second lavatory 26B through an opening 42A provided in the partition wall 1206.

A single second storage chamber 40B is also provided within the bases 28 of the sinks 16 of the third lavatory 26C and the fourth lavatory 26D.

The second storage chamber 40B extends into the bases 28 of the sinks 16 of the third lavatory 26C and the fourth lavatory 26D through an opening 42B provided in the partition wall 1206.

Two trash can devices 18 are provided, one trash can device 18 being shared by the first lavatory 26A and the second lavatory 26B, and the other trash can device 18 being shared by the third lavatory 26C and the fourth lavatory 26D.

Each trash can device 18 has a single trash can 44 and a single fire extinguisher 46.

The trash can 44 of one of the two trash can devices 18 is housed in the first storage chamber 40A, and the fire extinguisher 46 is disposed so as to be capable of spraying a fire-extinguishing agent into the trash can 44 housed in the first storage chamber 40A.

The trash can 44 is inserted into and removed from the first storage chamber 40A through an opening provided in the first front wall 1202A, or through an opening provided in one or both of the bases 28 of the sinks 16 of the first lavatory 26A and the second lavatory 26B, the opening(s) being closed by a lid plate.

As in the case of the first embodiment, this allows the amount of space that would be occupied by conventional trash cans each provided in each of the lavatories 26A, 26B to be reduced while maintaining the same capacity that would be afforded by providing individual conventional trash cans in each of the lavatories 26A, 26B, allowing for the amount of space occupied by the lavatory unit 10 to be reduced.

The trash can 44 of the other of the two trash can devices 18 is housed in the second storage chamber 40B, and the fire extinguisher 46 is disposed so as to be capable of spraying a fire-extinguishing agent into the trash can 44 housed in the second storage chamber 40B.

The trash can 44 is inserted into and removed from the second storage chamber 40B through an opening provided in the second front wall 1202B, or through an opening provided in one or both of the bases 28 of the sinks 16 of the third lavatory 26C and the fourth lavatory 26D, the opening(s) being closed by a lid plate.

As in the case of the first embodiment, this allows the amount of space that would be occupied by conventional trash cans each provided in each of the lavatories 26C, 26D to be reduced while maintaining the same capacity that would be afforded by providing individual conventional trash cans in each of the lavatories 26C, 26D, allowing for the amount of space occupied by the lavatory unit 10 to be reduced.

There is a single water heater 20, which is shared by the four lavatories 26A-26D. The water heater 20 is disposed, for example, within the base 28 of one of the four sinks 16.

The water heater 20 is connected to a water supply pipe 3402 leading to the faucet 34 of each of the lavatories 26A-26D and heats cold water provided by a water supply pipe in the fuselage, providing the water to the faucets 34 of the four sinks 16 via the water supply pipe 3402 as hot water.

This allows the amount of space that would be occupied by individually providing conventional water heaters in each of the lavatories 26A, 26B, 26C, 26D to be reduced, allowing for the amount of space occupied by the lavatory unit 10 to be reduced.

Furthermore, the lavatory unit 10 is provided with a single faucet controller 22 shared by the four lavatories 26A-26D, the controller being disposed, for example, within the base 28 of one of the four sinks 16.

When an infrared sensor with which each of the faucets 34 of the four sinks 16 is provided detects that a hand is inserted under the faucet 34, the faucet controller 22 opens a valve of the faucet 34 corresponding to the infrared sensor having detected the hand for a fixed length of time to provide cold water or hot water.

Furthermore, the lavatory unit 10 is provided with a single lighting controller 24 shared by the four lavatories 26A-26D, the controller being provided, for example, on the ceiling wall 1212.

The lighting controller 24 individually turns on lighting devices (fluorescent lamps, LEDs, etc.) of the four lavatories, and is provided with a step-down circuit that reduces the voltages of high-voltage power supplied from the fuselage for supply to the lighting devices.

Next, the effects of the present embodiment will be described.

In accordance with the present embodiment, a single structural frame 12 has four lavatories 26A-26D partitioned therein, each of the trash can devices 18 is shared by each of the lavatories 26A, 26B and the lavatories 26C, 26D, and a single water heater 20 is shared by the four lavatories 26A-26D, advantageously allowing for a reduced number of parts, simplified assembly, reduced space occupation, and reduced costs compared to cases in which four lavatory units are simply overlapped, while maintaining convenience.

Furthermore, the use of a single partition wall 1206 and a single rear wall 1204 and two trash can devices 18 is more advantageous in allowing for the amount of space occupied by the lavatory unit 10 to be reduced compared to cases in which four lavatory units are simply overlapped, while maintaining the capacity of the lavatories.

Note that a case in which two trash can devices 18 are provided, each trash can device 18 being shared by two lavatories, and a single water heater 20 is shared by four lavatories has been described for the second embodiment, but arrangements such as the following are also acceptable.

1) A trash can device 18 is provided in each of the lavatories 26A-26D, and a single water heater 20 is shared by the four lavatories 26A-26D.

2) A trash can device 18 is provided in each of the lavatories 26A-26D, and two water heaters 20 are provided, each water heater 20 being shared by two lavatories.

3) Two trash can devices 18 are provided, each of the trash can devices 18 being shared by each of the lavatories 26A, 26B and the lavatories 26C, 26D, and two water heaters 20 are provided, each of the water heaters 20 being shared by each of the lavatories 26A, 26B and the lavatories 26C, 26D.

Such arrangements also advantageously allow for a reduced number of parts, simplified assembly, reduced space occupation, and reduced costs while maintaining convenience.

Note that, in the first and second embodiments, cases in which a single structural frame is provided with an even number of lavatories such as two or four have been described, but an odd number of lavatories, such as three or five, may also be provided, and the arrangement of the lavatories with which the single structural frame is provided is not limited to the embodiments.

Disposition Configuration for Lavatory Unit According to a First Embodiment

Next, a disposition configuration for lavatory unit according to a first embodiment will be described.

Figure 4:
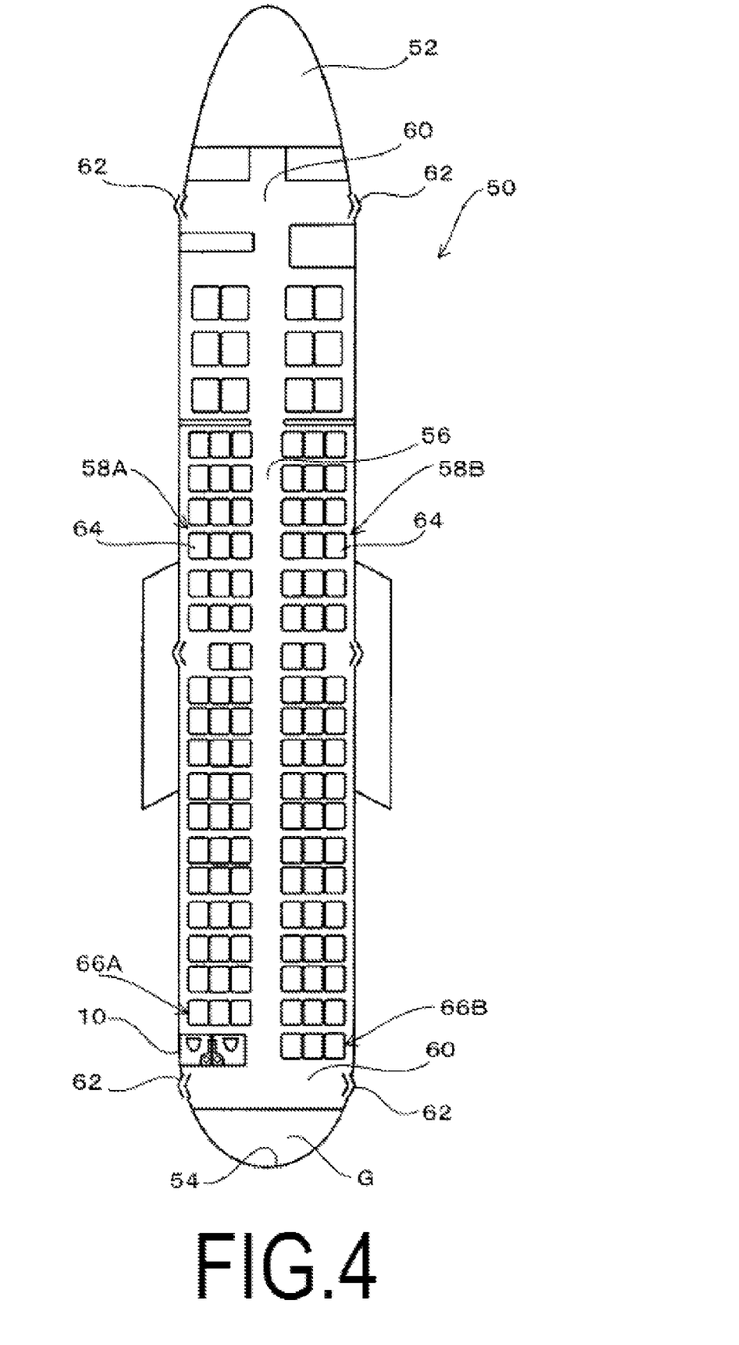
FIG. 4 is a plan view of a disposition configuration for lavatory unit according to a first embodiment.
Figure 5:
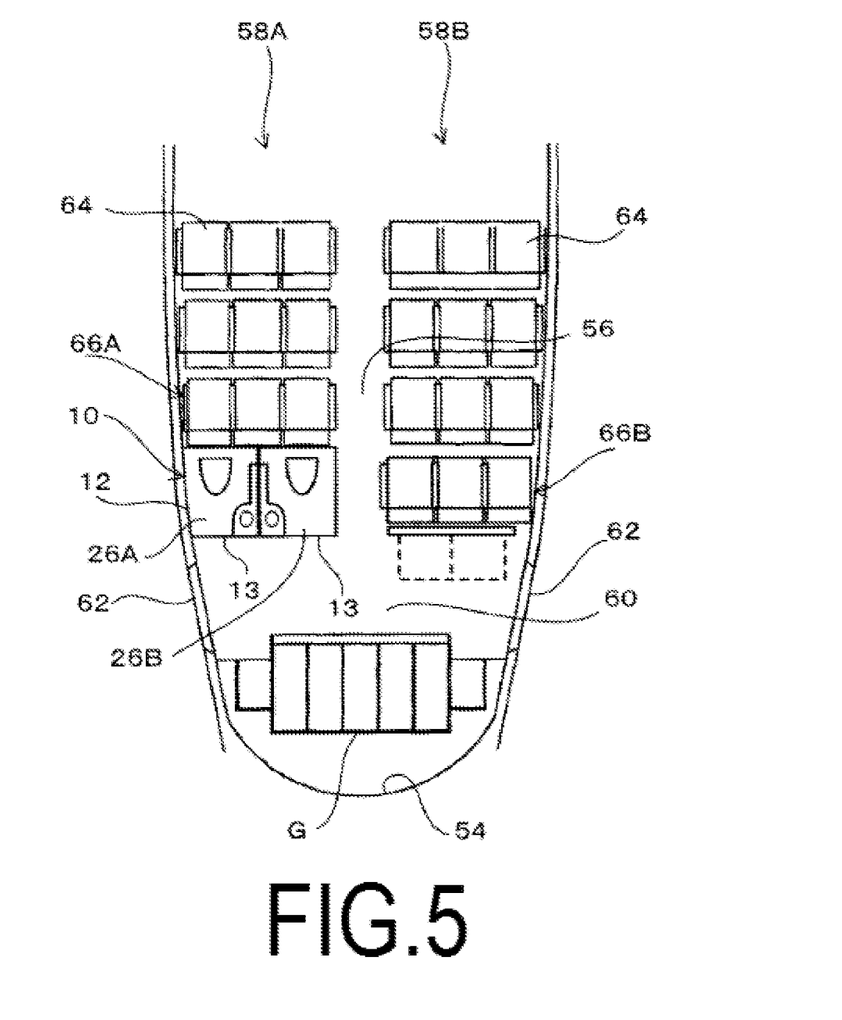
FIG. 5 is a magnified plan view of the main parts of the disposition configuration for lavatory unit according to the first embodiment.

As illustrated in FIGS. 4 and 5, the lavatory unit 10 according to the first embodiment illustrated in FIGS. 1 and 2 is disposed in a fuselage 50 of an aircraft.

A front part of the fuselage 50 constitutes a cockpit 52, and a rear part constitutes a pressure bulkhead 54. A longitudinal aisle 56, seat groups 58A, 58B on the left and right sides of the longitudinal aisle 56, and latitudinal aisles 60 are provided between the front and rear parts, with boarding entrances being labeled 62 in the drawings.

The longitudinal aisle 56 extends in the longitudinal direction of the fuselage 50 in a center constituting an intermediate position with respect to the latitudinal direction of the fuselage 50.

The seat groups 58A, 58B on the left and right sides are constituted by a plurality of seat rows arranged in the longitudinal direction of the fuselage 50, the seat rows having a plurality of seats 64 facing the front of the fuselage 50 and arranged in rows in the latitudinal direction of the fuselage 50.

Of the seat groups 58A, 58B on the left and right sides, the rearmost seat row 66B of the seat group 58B on the right side is positioned further to the rear in the longitudinal direction of the fuselage 50 than the rearmost seat row 66A of the seat group 58A on the left side.

The latitudinal aisles 60 extend in the latitudinal direction from the boarding entrances 62 of the fuselage 50 and connect with the longitudinal aisle 56.

The rearmost latitudinal aisle 60 extends in the latitudinal direction behind the rearmost seat row 66B of the seat group 58B on the right side.

As illustrated in FIGS. 4 and 5, there is a single lavatory unit 10, which is disposed behind the rearmost seat row 66A of the seat group 58A on the left side at a location corresponding to the rearmost seat row 66B of the seat group 58B on the right side across the longitudinal aisle 56.

Specifically, of the seat groups 58A, 58B on the left and right sides of the longitudinal aisle 56, the seat row 66A nearest the latitudinal aisle 60 in the seat group 58A is positioned further away from the latitudinal aisle 60 in the longitudinal direction of the fuselage 50 than the seat row 66B nearest the latitudinal aisle 60 in the other seat group 58B. The lavatory unit 10 is then installed at between the latitudinal aisle 60 and the seat row 66A nearest the latitudinal aisle 60 in the seat group 58A at a positioned corresponding to the seat row 66B nearest the latitudinal aisle 60 in the other seat group 58B across the longitudinal aisle 56.

The lavatory unit 10 is disposed in which a single structural frame 12 has two lavatories 26A, 26B partitioned therein, the lavatories 26A, 26B are arranged in a row in the latitudinal direction, and entrances to the lavatories 26A, 26B are each positioned in the latitudinal aisle 60.

Note that, in the drawings, G indicates a plurality of galleys arranged in a row in the latitudinal direction behind the latitudinal aisle 60 at the rear part of the fuselage 50.

Figure 8:
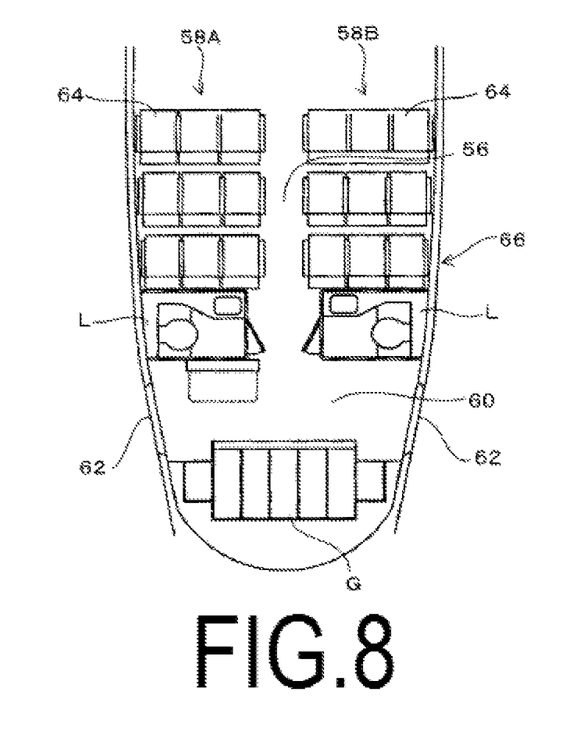
FIG. 8 is a magnified plan view of the main parts of an example of a conventional disposition configuration for lavatory unit.

As illustrated in FIG. 8, conventional lavatory units L are each disposed behind rearmost seat rows 66 of seat groups 58A, 58B on the left and right sides.

In the disposition configuration for lavatory unit according to the first embodiment, by contrast, a single lavatory unit 10 is installed to allow for reduced space occupation, and the unit is disposed behind the rearmost seat row 66A of the seat group 58A on the left side at a location corresponding to the rearmost seat row 66B of the seat group 58B on the right side across the longitudinal aisle 56, allowing the number of seats to be increased by three over the conventional example illustrated in FIG. 8 while maintaining two lavatories 26A, 26B.

Specifically, the lavatory unit 10 has the trash can device 18 and/or the water heater 20 singularly provided, allowing for the amount of space occupied by the lavatory unit 10 to be reduced compared to cases in which two lavatory units are simply overlapped, while maintaining the capacity of the lavatories.

Thus, disposing the lavatory unit 10 as described above allows the number of seats in the fuselage 50 to be increased while maintaining the number of lavatories.

Note that, in the embodiments described above, a latitudinal aisle 60 is positioned behind the seat groups 58A, 58B on the left and right sides, but the present technology is, of course, also applied to cases in which a latitudinal aisle 60 is positioned at an intermediate position in the longitudinal direction of the seat groups 58A, 58B on the left and right sides.

In such cases, the seat row nearest the latitudinal aisle 60 either in front of or behind the latitudinal aisle 60 in one seat group of the seat groups 58A, 58B on the left and right sides of the longitudinal aisle 56 may be positioned further away from the latitudinal aisle 60 in the longitudinal direction of the fuselage 50 than the seat row nearest the latitudinal aisle 60 either in front of or behind the latitudinal aisle in the other seat group, and, as described above, a lavatory unit 10 may be disposed between the latitudinal aisle 60 and the seat row nearest the latitudinal aisle 60 in the one seat group.

Disposition Configuration for Lavatory Unit According to a Second Embodiment

Figure 6:
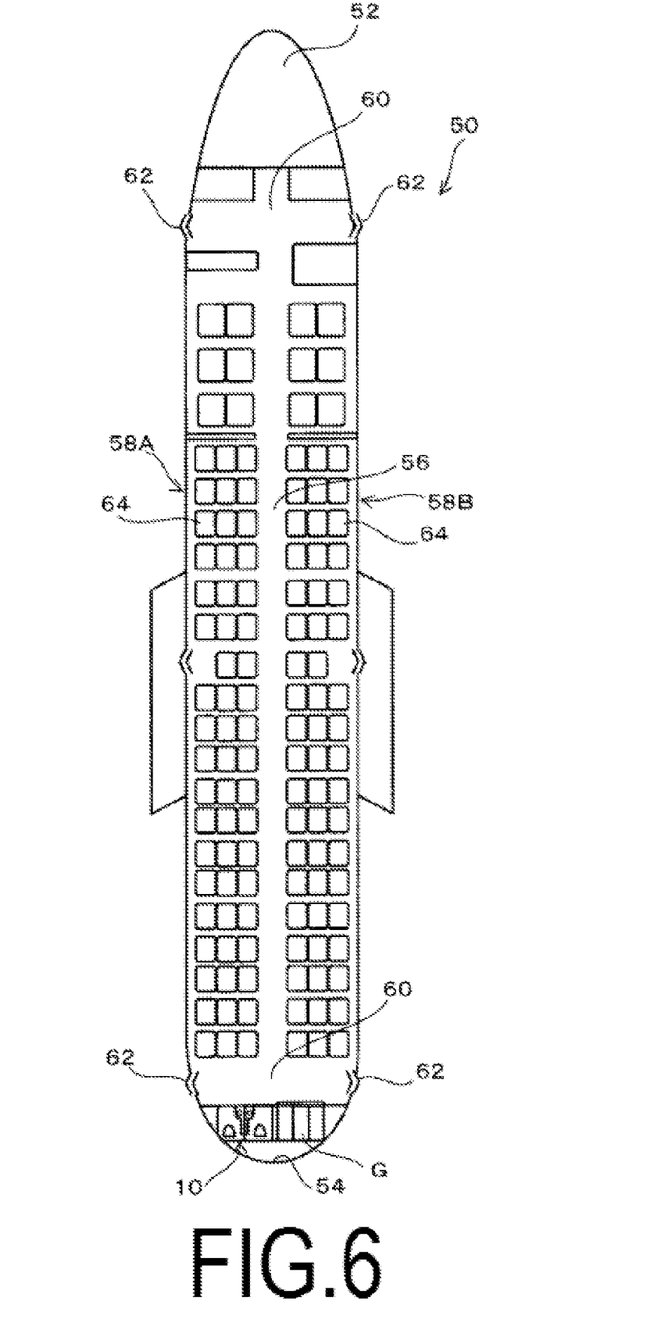
FIG. 6 is a plan view of a disposition configuration for lavatory unit according to a second embodiment.
Figure 7:
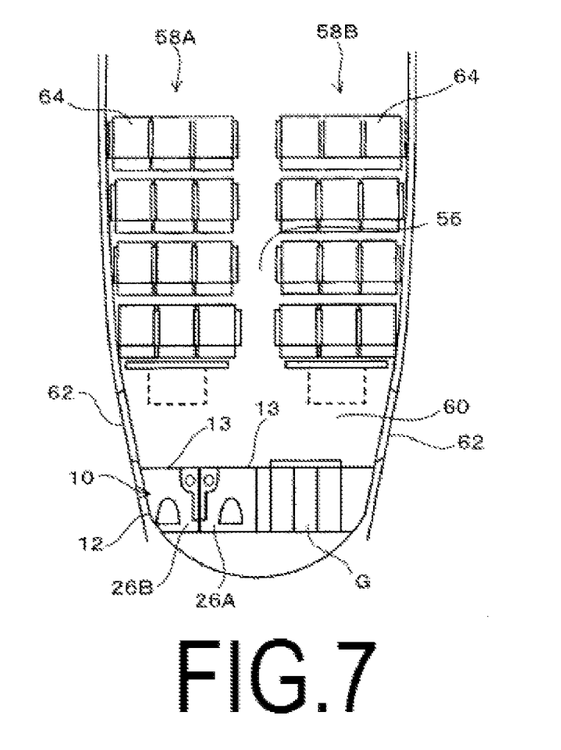
FIG. 7 is a magnified plan view of the main parts of the disposition configuration for lavatory unit according to the second embodiment.

As illustrated in FIGS. 6 and 7, the lavatory unit 10 according to the first embodiment illustrated in FIGS. 1 and 2 is disposed in a fuselage 50 of an aircraft.

The fuselage 50 is provided with a longitudinal aisle 56, seat groups 58A, 58B on the left and right sides of the longitudinal aisle 56, and latitudinal aisles 60, and, in addition, a single lavatory unit 10 and a plurality of galleys G are arranged in a row in the latitudinal direction behind the rearmost latitudinal aisle 60 at the rear part of the fuselage 50.

The lavatory unit 10 is disposed in which a single structural frame 12 has two lavatories 26A, 26B partitioned therein, the lavatories 26A, 26B are arranged in a row in the latitudinal direction, and entrances 13 to the lavatories 26A, 26B are each positioned in the latitudinal aisle 60.

The disposition configuration for lavatory unit according to the second embodiment is provided with two lavatories 26A, 26B and a plurality of galleys G arranged in a row in the latitudinal direction behind the latitudinal aisle 60 at the rear part of the fuselage 50.

As a result, although the amount of space taken up by the galleys G is reduced by the space occupied by the lavatory unit 10 compared to the conventional example illustrated in FIG. 8, it is possible to provide six more seats while maintaining two lavatories 26A, 26B.

Specifically, the lavatory unit 10 has the trash can device 18 and/or the water heater 20 singularly provided, allowing for the amount of space occupied by the lavatory unit 10 to be reduced compared to cases in which two lavatory units are simply overlapped, while maintaining the capacity of the lavatories.

Thus, disposing the lavatory unit 10 as described above allows the number of seats in the fuselage 50 to be increased while maintaining the number of lavatories.

What is claimed is:

1. An aircraft lavatory unit comprising:
    a structural frame provided with a lavatory, the lavatory having an entrance opened and closed by a door;
    a sink provided in the lavatory, the sink having a trash insertion port opened therein;
    a trash can device having a trash can and a fire extinguisher, the trash can being housed in a storage chamber within the sink and configured to contain trash inserted through the trash insertion port, the fire extinguisher being configured to spray a fire-extinguishing agent into the trash can upon a set temperature being reached or exceeded; and
    a water heater provided on a water supply pipe connected to a faucet of the sink;
    a single unit of the structural frame having a plurality of lavatories partitioned therein,
    at least one of the trash can device or the water heater being singularly provided and being shared by the plurality of lavatories.

2. The aircraft lavatory unit according to claim 1, wherein the structural frame has a single partition wall partitioning adjacent lavatories,
    sinks of the adjacent lavatories are each disposed by being attached to the partition wall,
    the trash can device used by the adjacent lavatories is singularly provided,
    the storage chamber is singularly provided and is formed, passing through interiors of the respective sinks of the adjacent lavatories, through an opening provided in the partition wall,
    the trash can is singularly provided and is housed in the storage chamber, and the fire extinguisher is singularly provided.

3. The aircraft lavatory unit according to claim 2, wherein the structural frame forming the adjacent lavatories has a front wall provided with two entrances, and a rear wall facing the front wall, and
    the partition wall extends between the front wall and the rear wall and partitions an area between the front wall and the rear wall into two lavatories.

4. A disposition configuration for the aircraft lavatory unit described in claim 1, wherein:
    a fuselage of an aircraft is provided with:

a longitudinal aisle extending in a longitudinal direction of the fuselage and positioned at an intermediate position with respect to a latitudinal direction of the fuselage;

seat groups having a plurality of seat rows arranged in rows in the longitudinal direction of the fuselage on left and right sides of the longitudinal aisle, the seat rows having a plurality of seats facing a front of the fuselage and arranged in rows in the latitudinal direction of the fuselage;

a latitudinal aisle extending from a boarding entrance of the fuselage in the latitudinal direction and connecting with the longitudinal aisle; and a seat row nearest the latitudinal aisle in one seat group of the seat groups on the right and left sides of the longitudinal aisle being positioned further away from the latitudinal aisle, with respect to the longitudinal direction of the fuselage, than a seat row nearest the latitudinal aisle in another seat group; and the lavatory unit is disposed between the latitudinal aisle and the seat row nearest the latitudinal aisle in the one seat group at a location corresponding to the seat row nearest the latitudinal aisle in the other seat group across the longitudinal aisle, the plurality of lavatories being disposed in a row in the latitudinal direction and entrances to the plurality of lavatories each being positioned in the latitudinal aisle.

5. A disposition configuration for the aircraft lavatory unit described in claim 1, wherein:
a fuselage of an aircraft is provided with:
a longitudinal aisle extending in a longitudinal direction of the fuselage and positioned at an intermediate position with respect to a latitudinal direction of the fuselage;

seat groups having a plurality of seat rows arranged in rows in the longitudinal direction of the fuselage on left and right sides of the longitudinal aisle, the seat rows having a plurality of seats facing a front of the fuselage and arranged in rows in the latitudinal direction of the fuselage;

a latitudinal aisle extending from a boarding entrance of the fuselage in the latitudinal direction and connecting with the longitudinal aisle at a rear part of the fuselage; and a galley disposed in a row in the latitudinal direction behind the latitudinal aisle at the rear part of the fuselage; and the lavatory unit is disposed in a row with the galley along the latitudinal direction behind the latitudinal aisle at the rear part of the fuselage, the plurality of lavatories being disposed in a row in the latitudinal direction and entrances to the lavatories each being positioned in the latitudinal aisle.

6. A disposition configuration for the aircraft lavatory unit described in claim 2, wherein:
a fuselage of an aircraft is provided with:
a longitudinal aisle extending in a longitudinal direction of the fuselage and positioned at an intermediate position with respect to a latitudinal direction of the fuselage;

seat groups having a plurality of seat rows arranged in rows in the longitudinal direction of the fuselage on left and right sides of the longitudinal aisle, the seat rows having a plurality of seats facing a front of the fuselage and arranged in rows in the latitudinal direction of the fuselage;

a latitudinal aisle extending from a boarding entrance of the fuselage in the latitudinal direction and connecting with the longitudinal aisle; and a seat row nearest the latitudinal aisle in one seat group of the seat groups on the right and left sides of the longitudinal aisle being positioned further away from the latitudinal aisle, with respect to the longitudinal direction of the fuselage, than a seat row nearest the latitudinal aisle in another seat group; and the lavatory unit is disposed between the latitudinal aisle and the seat row nearest the latitudinal aisle in the one seat group at a location corresponding to the seat row nearest the latitudinal aisle in the other seat group across the longitudinal aisle, the plurality of lavatories being disposed in a row in the latitudinal direction and entrances to the plurality of lavatories each being positioned in the latitudinal aisle.

7. A disposition configuration for the aircraft lavatory unit described in claim 2, wherein:
a fuselage of an aircraft is provided with:
a longitudinal aisle extending in a longitudinal direction of the fuselage and positioned at an intermediate position with respect to a latitudinal direction of the fuselage;

seat groups having a plurality of seat rows arranged in rows in the longitudinal direction of the fuselage on left and right sides of the longitudinal aisle, the seat rows having a plurality of seats facing a front of the fuselage and arranged in rows in the latitudinal direction of the fuselage;

a latitudinal aisle extending from a boarding entrance of the fuselage in the latitudinal direction and connecting with the longitudinal aisle at a rear part of the fuselage; and a galley disposed in a row in the latitudinal direction behind the latitudinal aisle at the rear part of the fuselage; and the lavatory unit is disposed in a row with the galley along the latitudinal direction behind the latitudinal aisle at the rear part of the fuselage, the plurality of lavatories being disposed in a row in the latitudinal direction and entrances to the lavatories each being positioned in the latitudinal aisle.

8. A disposition configuration for the aircraft lavatory unit described in claim 3, wherein:
a fuselage of an aircraft is provided with:
a longitudinal aisle extending in a longitudinal direction of the fuselage and positioned at an intermediate position with respect to a latitudinal direction of the fuselage;

seat groups having a plurality of seat rows arranged in rows in the longitudinal direction of the fuselage on left and right sides of the longitudinal aisle, the seat rows having a plurality of seats facing a front of the fuselage and arranged in rows in the latitudinal direction of the fuselage;

a latitudinal aisle extending from a boarding entrance of the fuselage in the latitudinal direction and connecting with the longitudinal aisle; and a seat row nearest the latitudinal aisle in one seat group of the seat groups on the right and left sides of the longitudinal aisle being positioned further away from the latitudinal aisle, with respect to the longitudinal direction of the fuselage, than a seat row nearest the latitudinal aisle in another seat group; and the lavatory unit is disposed between the latitudinal aisle and the seat row nearest the latitudinal aisle in the one seat group at a location corresponding to the seat row nearest the latitudinal aisle in the other seat group across the longitudinal aisle, the plurality of lavatories being disposed in a row in the latitudinal direction and entrances to the plurality of lavatories each being positioned in the latitudinal aisle.

9. A disposition configuration for the aircraft lavatory unit described in claim 3, wherein:

a fuselage of an aircraft is provided with:

a longitudinal aisle extending in a longitudinal direction of the fuselage and positioned at an intermediate position with respect to a latitudinal direction of the fuselage;

seat groups having a plurality of seat rows arranged in rows in the longitudinal direction of the fuselage on left and right sides of the longitudinal aisle, the seat rows having a plurality of seats facing a front of the fuselage and arranged in rows in the latitudinal direction of the fuselage;

a latitudinal aisle extending from a boarding entrance of the fuselage in the latitudinal direction and connecting with the longitudinal aisle at a rear part of the fuselage; and a galley disposed in a row in the latitudinal direction behind the latitudinal aisle at the rear part of the fuselage; and the lavatory unit is disposed in a row with the galley along the latitudinal direction behind the latitudinal aisle at the rear part of the fuselage, the plurality of lavatories being disposed in a row in the latitudinal direction and entrances to the lavatories each being positioned in the latitudinal aisle.

* * * * *